(12) United States Patent  
Brunswig et al.

(10) Patent No.: US 7,900,190 B2  
(45) Date of Patent: Mar. 1, 2011

(54) BUSINESS OBJECT TEMPLATES

(75) Inventors: Frank Brunswig, Heidelberg (DE); Thomas Fiedler, Pfinztal (DE); Martin Hartig, Speyer (DE); Andreas Morsch, Mannheim (DE); Baré Said, St. Leon-Rot (DE); Michael Seubert, Sinscheim (DE)

(73) Assignee: SAP AG, Walldorf (DE)

( * ) Notice: Subject to any disclaimer, the term of this patent is extended or adjusted under 35 U.S.C. 154(b) by 1196 days.

(21) Appl. No.: 11/526,136

(22) Filed: Sep. 21, 2006

(65) Prior Publication Data

US 2008/0126410 A1    May 29, 2008

(51) Int. Cl.  
*G06F 9/44* (2006.01)

(52) U.S. Cl. ............... 717/107; 717/105; 717/108; 717/116

(58) Field of Classification Search .................. None  
See application file for complete search history.

(56) References Cited

U.S. PATENT DOCUMENTS

| | | | |
|---|---|---|---|
| 7,266,565 B2 * | 9/2007 | Diab | 1/1 |
| 7,287,037 B2 | 10/2007 | An et al. | |
| 7,302,431 B1 | 11/2007 | Apollonsky et al. | |
| 2003/0135584 A1 | 7/2003 | Roberts et al. | |
| 2005/0050141 A1 | 3/2005 | An et al. | |
| 2005/0065966 A1 | 3/2005 | Diab | |
| 2005/0108684 A1 | 5/2005 | Sohn et al. | |
| 2005/0262189 A1 | 11/2005 | Mamou et al. | |
| 2006/0070024 A1 | 3/2006 | Park | |
| 2006/0242162 A1 | 10/2006 | Conner et al. | |
| 2007/0250481 A1 | 10/2007 | Fiedler | |

OTHER PUBLICATIONS

U.S. Appl. No. 11/408,929, Office Action, Mailed Sep. 29, 2008.

* cited by examiner

*Primary Examiner*—Chuck O Kendall  
(74) *Attorney, Agent, or Firm*—Mintz, Levin, Cohn, Ferris, Glovsky and Popeo, P.C.

(57) ABSTRACT

Business object templates which include a plurality of hierarchically arranged entities and characterize services associated with the entities can be used to generate new business objects. These new business objects are generated based on projections of the business object template. In some variations, the business objects include a subset of the entities defined by the business object template. In other variations, the business objects include all of the entities defined by the business object template but with only certain entities being activated.

17 Claims, 2 Drawing Sheets

BUSINESS OBJECT TEMPLATES

TECHNICAL FIELD

The subject matter described herein relates to projection objects derived from business object templates.

BACKGROUND

Business objects are real world entities modeled as objects in an information system. Business objects encapsulate both data structures and the functions applied to the data, while hiding their full complexity from other objects. This encapsulation of data and functions makes it easier to modify program components by allowing one to program with the relevant entities without having to know all the implementation details. Business objects also allow for the reuse of existing functions.

Client programs access business objects by reading their attributes, or by calling the methods that make up the interface of an object. Attributes describe the data stored in an object through a set of properties and provide direct read access to the data structures of objects although client programs cannot change them from outside. Methods provide a way to encapsulate the data structures of business objects, and to process them. When accessing an object, the client program calls a method with parameters and gets back return parameters. The interface is the set of methods associated with a business object, and determines how an object interacts with the outside world. The client program defines the object types to be used and, at runtime, creates object instances of those object types.

Object-oriented programs utilizing business objects are being increasing adopted. However, the process of deriving new business objects can be cumbersome and often result in redundancies and inconsistencies among business objects within a system.

SUMMARY

In one aspect, instantiation of a business object can be initiated and subsequently instantiated. The business object is a data structure can be derived from a projection of a business object template. The business object template is a data structure that comprises a plurality of hierarchically arranged entities that also characterizes services associated with the entities. The projected business object comprises a subset of the plurality of hierarchically arranged entities.

In some variations, the business object can also include entities from the plurality of hierarchically arranged entities that are not in the subset. With such arrangements, the business object can distinguish or otherwise identify entities that are not in the subset so that only those entities within the subset are activated in the instantiated business object. Alternatively, the entities that are not within the subset can be removed prior to instantiation (and/or at design-time).

Multiple business objects can be instantiated from a single business object template. For some business objects, two or more business objects projected from a single business object template can share one or more entities which may include a root entity of the business object template.

In an interrelated aspect, a business object template can be presented (i.e., made available, etc.). The business object template comprises a plurality of hierarchically arranged entities and it characterizes services associated with the entities. Thereafter, a plurality of business objects can be projected based on the business object template. In some variations, the projected business object includes only a subset of the entities from the business object template. In other variations, the projected business object includes all of the entities from the business object template with certain specified entities being deactivated during runtime.

In a further interrelated aspect, an electronic message containing a request to initiate a service is received in a landscape of computer systems providing message-based services (e.g., a Service Oriented Architecture, etc.). Thereafter, a business object implicated by (e.g., associated with) the requested service is instantiated. The business object is derived from a projection of a business object template which comprises a plurality of hierarchically arranged entities. The business object comprises at least a subset of the hierarchically arranged entities. After the business object is instantiated, the requested service identified in the message is initiated.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, by using a business object template to derive business objects, data consolidation, data sharing, and reuse of data are optimized. In particular, with the subject matter described herein, the amount of shared data can be greater than a generalization or intersection of all shared data. Moreover, the techniques described herein obviate artificial specializations that were previously generated simply to share data and modeling redundancies due to different specialization types (e.g., Person/ Organization, Customer/Supplier, etc.).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
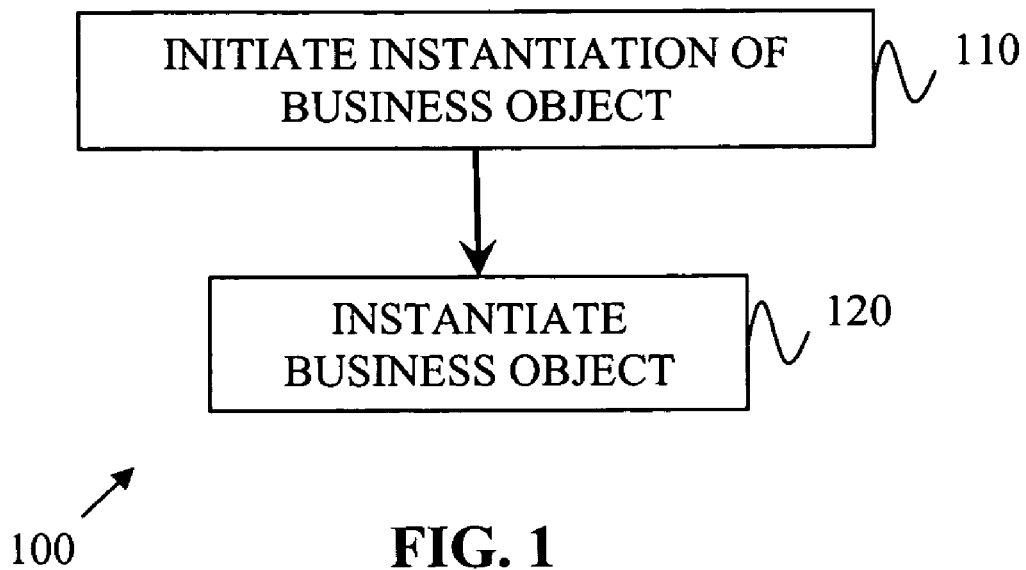
FIG. 1 is a process flow diagram illustrating a runtime instantiation of a business object projected from a business object template.

FIG. 1 is a process flow diagram illustrating a method 100 in which, at 110, instantiation of a business object is initiated. Thereafter, at 120, the business object is instantiated. The business object is derived from a projection of a business object template. The business object template comprises a plurality of hierarchically arranged entities and characterizes services associated with the entities. The business object comprises a subset of the plurality of hierarchically arranged entities. In some variations, the business object comprises all of the entities of the business object template with only a subset of the entities being activated (e.g., made available, etc.).

Figure 2:
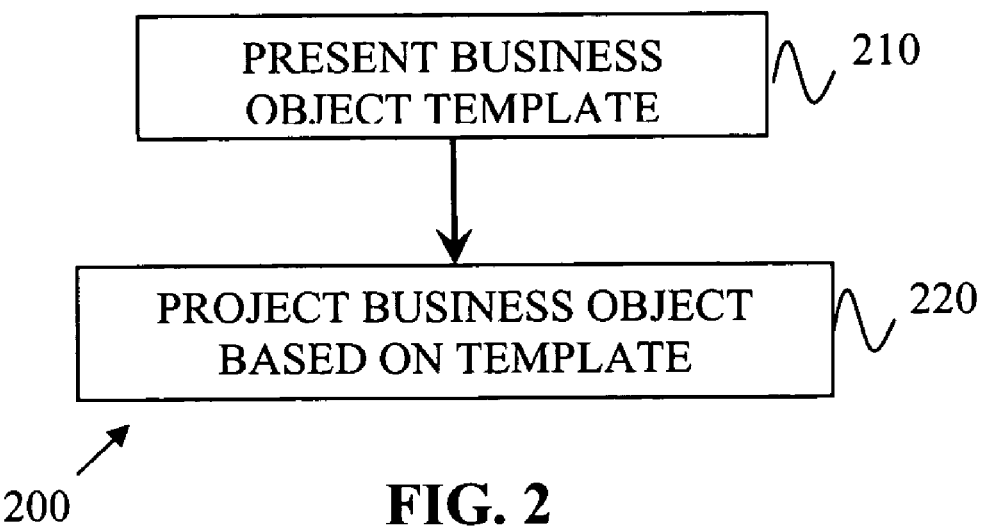
FIG. 2 is a process flow diagram illustrating a design-time projection of a business object from a business object template.

FIG. 2 is a process flow diagram 200 in which, at 210, a business object template is presented (i.e., made available to a module, user, etc.). The business object template comprises a plurality of hierarchically arranged entities and it characterizes services associated with the entities. After presentation of the business object template, at 220, one or more business objects can be projected based on the business object template. In some variations, the business objects include a subset of the plurality of hierarchically arranged entities and in other variations, the business objects include all of the hierarchically arranged entities with only a subset being active (i.e., available).

Figure 3:
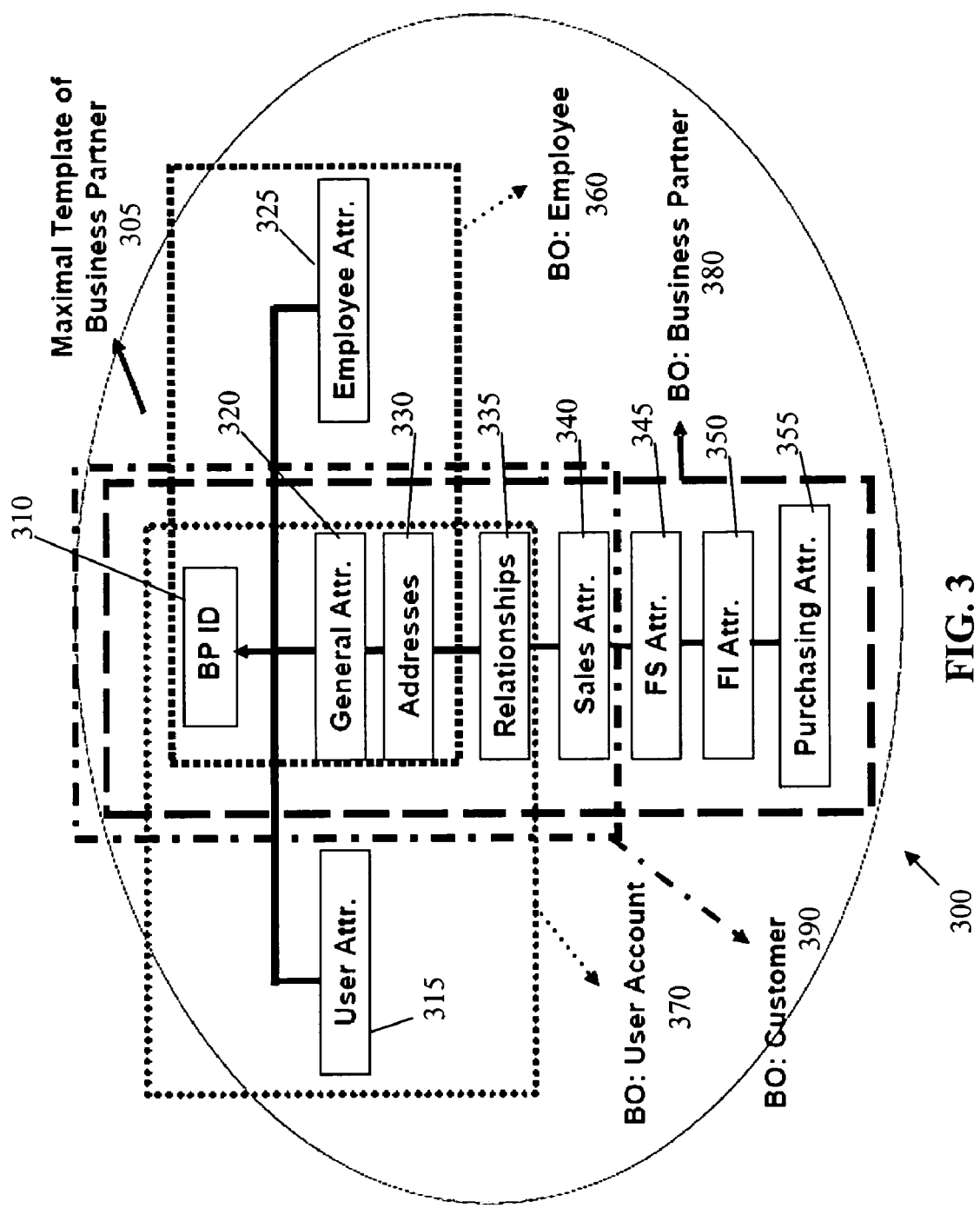
FIG. 3 is a diagram illustrating a business object template and several projections thereon.

FIG. 3 is a diagram 300 illustrating a business object template 305 for the business object Business Partner. The business object template 305 characterizes a plurality of entities including Business Partner Identification (the root entity) 310, User Attributes 315, General Attributes 320, Employee Attributes 325, Addresses 330, Relationships 335, Sales Attributes 340, Financial Sales Attributes 345, Financial Statements Attributes 350, and Purchasing Attributes 355. Each of these entities (represented as nodes) characterize data useful for a business process and from which services may be invoked. From the business object template 305, a plurality of business objects can be projected based on the underlying business process for which the business object will be used. Sample business objects include an Employee business object 360, a User Account business object 370, a Business Partner business object 380 (note that this business object includes all of the entities of the business object template 305), and a Customer business object 390.

As illustrated in FIG. 3, many business objects (e.g., SAP business objects, etc.) can be used in different business scenarios or processes as generalizations of different business entities. For example, the business object "Business Partner" is a generalization of entities like "Sold-To-Party" or "Supplier". Some business objects (e.g., SAP business objects, etc.) can occur as Business Partner business object in certain contexts or in some specific portion of a business process (e.g., "Employee", "Legal Unit", etc.). In addition, some business objects (e.g., SAP business objects, etc.), can provide an integration with the Business Partner business object to support special business scenarios (e.g., user account for contact person, etc.)

The subject matter described herein enables the building of various business objects based on meta-data projections of a single abstract model which is referred to herein as a business object template. The templates can contain the superset of meta-data from which various business objects useful for various business scenarios and processes can be characterized. In some variations, the templates can appear as new entities in the SAP Enterprise Services Repository. In addition, in some variations, the business object template can only be utilized during design-time and so the template cannot be instantiated at runtime.

Business objects can be derived from a business object template by projections and business objects built upon such projections can be referred to as "projection objects". A projection is a specialization from any appropriate specialization type and is built as a subset of nodes and services (of the nodes and services of the business object template). In order to build a new projection with specific data and services, a business object template must be extended as the template contains all meta-data and services for all projections that can be derived therefrom. As a result, a business object template can grow and be extended as needed during a software-life cycle.

A business object template can be modeled in a user interface such as SAP Integration Builder similar to that of a regular business object with the exception that it is designated as a template. The template itself need not be introduced as a meta-entity in the meta-model.

Projections based on business object templates can have a template proxy in a runtime repository. In other words, proxy generation also can support template generation which is analogous to business object generation but omitting service provider and service adapter information. Generic logic for templates can be implemented in a super class that supports the service provider interfaces of the corresponding service adapter. The service provider of the projections inherits the super class to enable an optimal reuse of coding and the behavior.

Cross-template associations can be required from 1-order to Business Partner business object. In a concrete CRM Sales Order projection, an association describes a path to the Customer business object but in a SRM Purchase Order an association describes a path to a Supplier business object. On the other hand, associations with no business semantic (Sales Order->Supplier) can be excluded from the model.

The cross-template association can be modeled provided that it explicitly enabled in projections. If such an association in a source projection does not contain a target which is also a projection, then this association is not visible in the meta-data of the source projection. However, the association is still visible in the meta-data of the underlying template.

In some variations, an additional property 'REMOVED' can be introduced into the meta-model to describe entities of the business object template that are not used and visible within the projection. This arrangement allows for a complete description of a logical view of the projection both at design-time and at runtime. At runtime, only entities of the template that are not marked as removed will be used as meta-data entities for the client.

Alternatively, in other variations, the functionality of the REMOVE property can be realized by combining DISABLED=TRUE and FINAL=TRUE properties. A disabled and final property cannot be changed and therefore such a property or entity cannot have any functionality for a customer. Therefore, such properties or entities can be removed.

Shared instance handling can be implemented such that one business object instance can be used in different projections in the same transactional context at the same time. One approach for implementing such an arrangement might allow a service provider of the projections to use Link Control Protocol (LCP) for communication and provide that additional meta-data describe which projections are available at any particular moment for each business object instance.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable medium embodying instructions that when performed by one or more machines result in operations comprising:
    instantiating a first business object, the business object being derived from a projection of a business object template, the business object template comprising a plurality of hierarchically arranged entities and characterizing services associated with the entities, the business object comprising a subset of the plurality of hierarchically arranged entities; and
    instantiating a second business object while the first business object is instantiated, the second business object being derived from a second projection of the business object template, the second business object comprising a second subset of the plurality of hierarchically arranged entities, the second subset being different than the first subset.

2. An article as in claim 1, wherein the first business object further comprises entities from the plurality of hierarchically arranged entities that are not in the subset.

3. An article as in claim 2, wherein the first business object distinguishes the entities that are not in the subset, and wherein only those entities within the subset are activated in the instantiated first business object.

4. An article as in claim 1, wherein instantiating comprises: removing entities that are not within the subset.

5. An article as in claim 1, wherein the first subset and the second subset comprise common entities.

6. An article as in claim 5, wherein the common entities include a root entity in the plurality of hierarchically arranged entities.

7. An article as in claim 5, wherein the first business object and the second business object communicate with each other via a service provider for both of the first business object and the second business object.

8. An article as in claim 5, wherein the article is further operable to cause data processing apparatus to perform operations comprising:
    determining which projections of the business object template are available to each of the first business object and the second business object.

9. An article as in claim 1, wherein the article is further operable to cause data processing apparatus to perform operations comprising:
    receiving an electronic message requesting an initiation of a service;
    wherein the initiating an instantiation of the first business object occurs in response to receipt of the message.

10. An article as in claim 9, wherein the article is further operable to cause data processing apparatus to perform operations comprising:
    provide the service requested in the message.

11. An article comprising a non-transitory machine-readable medium embodying instructions that when performed by one or more machines result in operations comprising:
    presenting, during design time, a business object template, the business object template comprising a plurality of hierarchically arranged entities and characterizing services associated with the entities;
    projecting, during design time, a plurality of business objects based on the business object template, the business objects comprising a subset of the plurality of hierarchically arranged entities; and
    simultaneously instantiating two or more of the plurality of business objects.

12. An article as in claim 11, wherein the article is further operable to cause data processing apparatus to perform operations comprising:
    receiving electronic messages in a landscape of computer systems providing message-based services, the messages containing requests to initiate services which results in the instantiation of the business objects.

13. An article as in claim 12, wherein the article is further operable to cause data processing apparatus to perform operations comprising:
    providing the services requested in the messages.

14. An article as in claim 11, wherein presenting the business object template comprises:
    initiating a graphical display of the business object template to a user during design time.

15. An article as in claim 11, wherein presenting the business object template comprises:
    transmitting data characterizing the business object template.

16. An article comprising a non-transitory machine-readable medium embodying instructions that when performed by one or more machines result in operations comprising:

receiving a first electronic message in a landscape of computer systems providing message-based services, the first message containing a request to initiate a first service;

instantiating a first business object implicated by the requested first service, the first business object being derived from a first projection of a business object template, the first business object template comprising a first plurality of hierarchically arranged entities, the first business object comprising a first subset of the plurality of hierarchically arranged entities;

initiating the requested first service identified in the first message;

receiving a second electronic message in the landscape of computer systems providing message-based services, the second message containing a first request to initiate a service;

instantiating a second business object implicated by the requested second service, the second business object being derived from a second projection of the business object template, the second business object comprising a second subset of the plurality of hierarchically arranged entities; and initiating the requested second service identified in the second message.

17. An article as in claim 16, wherein the computer systems interact according to a service oriented architecture.

* * * * *